United States Patent Office 2,938,908
Patented May 31, 1960

2,938,908
ARYL-HYDRAZINO-PYRIDINES

Sien Moo Tsang, Middlesex, Charles E. Lewis, Somerville, and Albert P. Paul, New Brunswick, N.J., assignors to American Cyanamid Company, New York, N.Y., a corporation of Maine No Drawing. Original application Mar. 1, 1957, Ser. No. 643,231, now Patent No. 2,893,816, dated July 7, 1959. Divided and this application Mar. 7, 1958, Ser. No. 719,745

4 Claims. (Cl. 260—295)

This invention relates to new intermediates for the preparation of dyes for polyacrylonitrile fibers containing a major proportion of acrylonitrile. More specifically, it relates to new hydrazines of the structure:

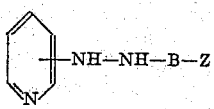

in which the hydrazine bridge is conjugated with the heteroatom, B is an aromatic radical of less than three six-membered rings, and Z is a group convertible into a primary amino group without attack on an azo bridge.

The polyacrylonitrile fibers, which have become increasingly useful articles of commerce, are difficult to dye. Most of the commercially available fibers of this type contain a major proportion of polyacrylonitrile. In most cases over 85% of the fiber is acrylonitrile. Few of the standard dyestuffs available show affinity for these high-acrylonitrile-content-fibers. Especially, it has been hard to obtain deep shades on these fibers, since deep shades require a strong affinity of the fiber for the dyestuff. The only way to achieve deep shades has been to increase the time and temperature of the dyeing process. Such drastic conditions of dyeing result in injury to the fabrics. The resistant properties of these fibers are desirable for general textile use because they render the fiber physically durable. However, the problem of dyeing has been so great that these durable types may have to be superseded by more dyeable types which are less durable physically unless methods of dyeing them readily are found. In some fibers there has been incorporated a basic comonomer for the main purpose of making them dyeable with acid dyes.

The dyes which have been on the market for acrylic fibers not containing basic comonomers are not azo dyes but primarily are dyes of the styryl or polymethine or anthraquinone class. In general, in the past it has not been believed possible for azo dyes to have good fastness properties on acrylic fibers of this type, and it is most surprising to find a class of dyes which does have such fastness. It is further surprising that the azo dyes have sufficient light fastness to be of value, since azo dyes in general have poor light fastness unless converted into metallic complexes. It is further surprising that amino azo dyes should have pH stability, since such dyes are known to undergo a shade change with pH.

We have found that azo derivatives of quaternized heterocyclic ring systems having an electron donating or releasing group in conjugation through the azo group with the quaternized nitrogen have an exceptional affinity for acrylic fibers, especially those containing no basic comonomers. The affinity of these dyes is so strong that very heavy shades may be obtained, ranging from yellow to red, bordeaux, maroon, red-brown, brown, violet and blue shades. At the same time, we have found that these dyes can be used to give very pleasing light shades and that the shades obtained from these dyes have excellent light fastness with practically no sensitivity to change of pH. We have also found that dyes of this class having for the quaternized heterocyclic ring system a pyridine or its homologs and benzo derivatives, or 2-arylbenzazoles in which the azo group is on the 4 position of the aryl ring are new dyes of exceptional properties. These inventions are claimed in our copending applications Serial No. 643,231, filed March 1, 1957, now U.S. Patent No. 2,893,816, of which this is a division, and another divisional application, Serial No. 719,744, filed March 7, 1958, now abandoned. We have further found an unusual synthetic process for the synthesis of intermediates for some of these compounds and the new intermediate hydrazines which are used in this synthesis form the subject of this present application.

These dyes have the general formula:

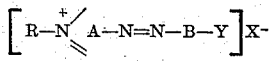

in which A may be any one of a number of heterocyclic ring systems, R is a quaternizing group, B is an aryl carbocyclic radical of less than three rings, Y is an electron donating group, and X⁻ is an anion. The detailed equivalents of each of these symbols are discussed below, but in general the electron donating group Y must be in conjugation through B with the azo group and through A with the quaternary nitrogen. A is the remainder of a pyridine ring system, in which the quaternized nitrogen is an integral part of a heterocyclic ring. The azo bridge must be attached to the pyridine ring system in such a way that it is in conjugation with the quaternized nitrogen, that is, that it is separated from the quaternized nitrogen by an odd number of unsaturated atoms.

The aryl group on the other side of the azo bridge, for which the symbol B is used in the general formula, is a carbocyclic aromatic radical of less than three rings, such as the benzene, biphenyl or naphthalene ring systems. The substituent Y on this aryl group B is an electron donating or releasing group. It must be substituted on B in such a way that it too is in conjugation with the azo group, that is, Y is separated from the carbon to which the azo bridge is linked by an odd number of carbon atoms. Electron releasing substituents in an aromatic ring are those having a dipole whose negative end is toward the ring. It is necessary that this substituent be of this nature in order to get adequate substantivity.

The quaternizing group R may be any organic radical. R may be an alkyl such as methyl, ethyl, propyl, butyl, lauryl, cetyl, octadecyl, and the like. It may be an alkenyl group such as allyl or crotyl, or an aralkyl such as benzyl or substituted benzyl or it may be a cycloalkyl group such as cyclohexyl and the like, or an aryl such as phenyl, substituted phenyl, naphthyl, biphenyl, and the like.

The anion X⁻ may be any suitable anion of an acid, such as the bromide, iodide, chloride, sulfate, phosphate, nitrate, acetate, methosulfate, ethosulfate, and the like. In general, the anions of the strong mineral acids such as the halides, the sulfates, the nitrates and the phosphates, or the anions of organic sulfonic acids such as the benzenesulfonate and the like are preferred but the anions of organic acids such as the organic carboxylic acids will be equally well usable.

In the general dyestuffs, groups A and B may be further substituted but the substituents must be so chosen that the net charge on the dye molecule remains positive. Substituents such as alkyl, nitro, alkoxy and halogeno groups are usually suitable. In all cases, the azo group must be in a position conjugated with the quaternized nitrogen.

One of the types of these new dyes which is especially to be preferred includes those in which A is the residue of a pyridine, substituted pyridine or benzopyridine, defined collectively as a monazine; that is an aromatic ring system of one or two rings having one six membered heterocyclic aromatic ring comprising five carbons and one nitrogen. Of these an especially preferred species are the cationic pyridinium dyes of the formula:

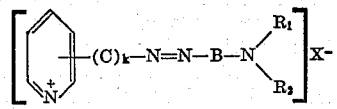

where the group C is attached to the pyridinium nucleus in the 2 or 4 position (that is, in conjugation with the quaternary nitrogen), $k$ is 0 or 1 (i.e., the azo bridge is either bonded directly to the pyridine ring or through C), C is an azophenylene group in which the azo group is conjugated through the phenylene with the azo bridge in the formula, B is an arylene radical of the benzene or naphthalene series, the amino nitrogen being attached to a position conjugated with the azo group, as described above (that is, ortho or para in the same ring and where the group B is, e.g., naphthalene, also in the 5 or 7 positions in the other ring), R is an alkyl, substituted alkyl, cycloalkyl, aryl, aralkyl or alkenyl group as described above, and X is an anion of an acid such as the iodide, bromide, chloride, methosulfate, ethosulfate, or phosphate as described above, $R_1$ and $R_2$ may be hydrogen, alkyl, alkylene, aryl, etc. The dye molecule may be further substituted provided the net charge of the dye molecule remains positive. The azo group must be in the 2 or 4 position obviously in order to be conjugated with the quaternary nitrogen. If the azo group is in a meta position (i.e., 3 or 5) of the pyridine nucleus, a definite loss in affinity for acrylic fibers and poor light fastness is obtained.

The 2-arylazo pyridinium dyes generally demonstrate the greater pH stability of shade. However, the 4-azo type in which the azo bridge is para to the quaternized nitrogen in the pyridinium ring also have very strong affinity for acrylic fibers and in some cases are just as stable to pH.

The dyestuffs to be used in our invention can be prepared by a number of various methods, some of which are more applicable to some dyes than to others. In the following discussion of these various preparations, the schematic formulae use the same general symbols as are used for the general formula of dyestuffs above.

1. COUPLING FOLLOWED BY QUATERNIZATION

The diazo derivative of a heterocyclic amine can be coupled with the proper coupling agent and the resulting azo dye quaternized as illustrated by the following schematic formula:

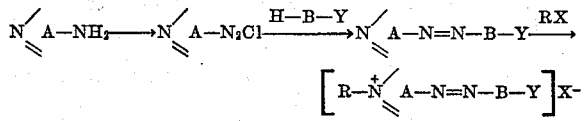

(Adversely, the diazotizable heterocyclic amine can be first quaternized and then diazotized and coupled.)

2. CONDENSATION OF AN AMINE WITH A NITROSO COMPOUND

Another method of preparation of the dyestuffs to be used in our invention, which is especially useful for the 2-azopyridinium dyestuffs of our invention, is the condensation of a 2- or 4-aminopyridine with a nitroso compound followed by quaternization of the resultant azo dye. This preparation can be illustrated by the following equation using 2-aminopyridine and para-nitroso dimethylaniline as the illustrative reactants.

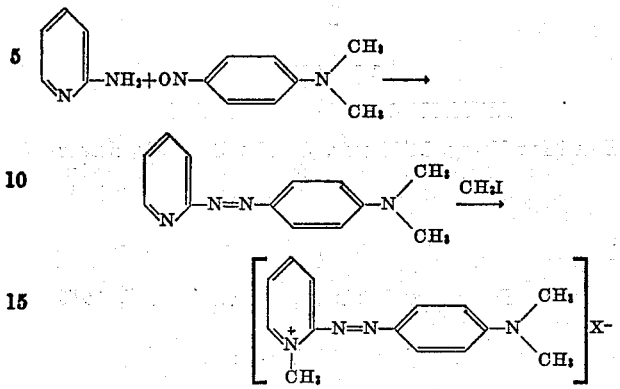

This method is especially important because such compounds as diazotized 2-aminopyridine is unstable and cannot be coupled with aromatic amine coupling components. Hence, the azo compounds cannot be made by the usual azo methods of diazotization and coupling. Consequently, this condensation or another alternative preparation must be used. This latter alternative preparation uses the intermediates which are the subject of the invention claimed herein.

3. CONDENSATION OF A HALOPYRIDINE WITH A SUBSTITUTED PHENYLHYDRAZINE

Another alternative preparation for those azo compounds not readily derivable by a diazotization and coupling procedure, is to condense a halo compound with an aryl hydrazine properly substituted, and to oxidize the resulting diaryl hydrazine to the azo body. This procedure can be illustrated by the following equation using 2-bromopyridine and para-nitro-phenyl-hydrazine as the reactants.

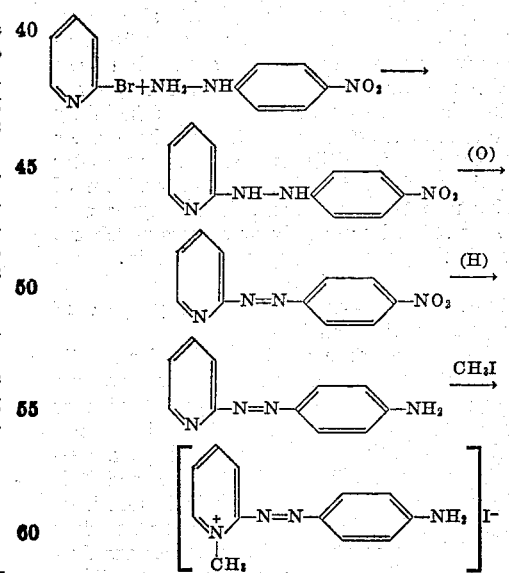

This reaction is carried out using an excess of the 2-halopyridine at moderate temperatures without the need of pressure equipment.

The substituted pyridyl aryl hydrazines which are the intermediates of this process form the invention claimed herein. They may be represented by the formula:

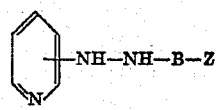

in which the hydrazine bridge is conjugated with the said heteroatom, B is an aromatic ring system of less than three six-membered rings, and Z is a group convertible into an amine group under conditions which do not affect an azo bridge.

The group B may be any radical of the benzene, naphthalene, diphenyl, pyridine or quinoline series with or without other substituents such as alkyl, halogen, nitro and the like.

The group Z is any group convertible into an amine group under conditions not affecting an azo bridge. Thus, it can be nitro which can be reduced with sodium sulfide to an amino group, or it can be acylamino such as acetamido, benzoylamino, benzenesulfonylamino, benzene phosphonylamino, and the like, which are hydrolyzable to free amino. The aim of this process for preparing the dyes is to obtain free amino groups conjugated to an azo bridge. The azo bridge cannot, as described above, be formed by the usual diazotization and coupling and the alternative method of condensing a nitroso compound with an amino pyridine is unusable because of self-condensation when there is a free amino group in the nitro compound. Consequently, a hydrazine is formed with a group in conjugation therewith which can, after oxidation of the hydrazine to an azo compound, be transformed into an amine group. These hydrazines form this invention and the groups thus transformable without attack on the azo group are the groups Z. Other groups including second groups which are the same as the groups defined as Z may also be present.

Examples of hydrazines of this invention are:

N¹-4-nitrophenyl-N²-2-pyridyl hydrazine
N¹-2,4-dinitrophenyl-N²-2-pyridyl hydrazine
N¹-4-nitro-1-naphthyl-N²-2-pyridyl hydrazine
N¹-4-acetamino-1-naphthyl-N²-2-pyridyl hydrazine
N¹-4-nitrophenyl-N²-4-pyridyl hydrazine
N¹-4-benzoylaminophenyl-N²-2-pyridyl hydrazine
N¹-4-o-toluoylaminophenyl-N²-2-pyridyl hydrazine
N¹-4-p-methoxybenzoylaminophenyl-N²-2-pyridyl hydrazine
N¹-4-benzenesulfonylaminophenyl-N²-2-pyridyl hydrazine
N¹-2-nitrophenyl-N²-4-pyridyl hydrazine
N¹-5-nitro-2-pyridyl-N²-2-pyridyl hydrazine
N¹-4-nitro-2-phenylphenyl-N²-2-pyridyl hydrazine
N¹-3,5-dinitro-2-pyridyl-N²-2-pyridyl hydrazine Such compounds, new to the art, are not only useful in preparing new dyes but also as intermediates for antioxidants, intermediates for pyrazolidones, and for other products.

It is an important aspect of our invention that, by their use, azopyridinium dyes can be obtained which are not preparable by the alternative procedures described previously. The incapacity of diazotized 2-aminopyridines to be coupled to aromatic amines prevents the use of Method I with them and Method II is inoperative when Y is a free amino group, a class of dye which is especially advantageous. Consequently, these dyes are only preparable through the unsymmetrical hydrazines of this invention.

Our invention can be further illustrated by the following examples in which parts are by weight unless otherwise specified.

Example 1

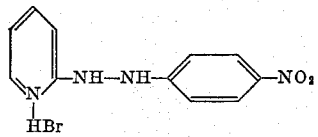

A mixture of 20 parts of para-nitrophenylhydrazine and 63.2 parts by volume of 2-bromopyridine is heated gently until the mixture is homogeneous. The mixture is then heated to the boiling point of 2-bromopyridine for a few minutes, after which it is cooled. The precipitated product is filtered and dried, giving a good yield of 2-para-nitrophenylhydrazinylpyridine hydrobromide.

If, instead of para-nitrophenylhydrazine, equivalent parts of the following compounds are used, the corresponding hydrazinyl derivatives, suitable as intermediates for preparing the acrylic fibers dyes are obtained:

o-Nitrophenylhydrazine
3,4-dinitrophenylhydrazine
2,4-dinitrophenylhydrazine
2,6-dinitrophenylhydrazine
2-acetamino-1-naphthylhydrazine
4-nitro-1-naphthylhydrazine Also, in the above procedure, the use of other 2- or 4-halogenopyridines in place of 2-bromopyridine gives the corresponding intermediates.

Example 2

The hydrohalides of Example 1 may be converted to the corresponding free bases by the following method:

10.05 parts of 2-p-nitrophenylhydrazinylpyridine hydrobromide are suspended in 200 parts of water and treated with a solution of 3.19 parts of sodium bicarbonate in 50 parts of water. The reaction mixture is stirred until neutralization is complete and is then filtered to give the free base.

Example 3

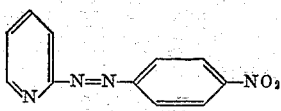

To a stirred suspension of 24.62 parts of 2-p-nitrophenylhydrazinylpyridine hydrobromide in 300 parts by volume of glacial acetic acid heated at gentle reflux is added gradually a solution of 62.4 parts by volume of 1N sodium nitrite in 40 parts of water. The reaction mixture is cooled, diluted with 1000 parts of water and made alkaline by the addition of sodium carbonate. Filtration isolates brown crystals of the product.

Example 4

To a solution of 6.30 parts of 2-p-nitrophenylhydrazinylpyridine in 50 parts by volume of glacial acetic acid is added gradually, at reflux, a solution of 18.0 parts by volume of 1N sodium nitrite in 12 parts of water. The reaction mixture is heated at reflux until the reaction is complete; about half of the acetic acid is removed by steam distillation and the resulting mixture diluted with 500 parts of water. Neutralization at 10–15° C. with concentrated ammonium hydroxide isolates brown crystals of the product.

Example 5

A mixture of 1.42 parts of 2-p-nitrophenylhydrazinylpyridine hydrobromide and 21 parts by volume of 30% sodium hydroxide solution is heated at the boil for 45 minutes while a stream of air is blown through the mixture. On cooling, the mixture is filtered to give brown crystals.

Other hydrazines prepared as shown in Example 1 may be oxidized by the methods of Examples 3, 4 or 5 to form azo compounds, the nitro group of which may be reduced to an amino group, and, quaternized by the method of Example 6 to give new cationic dyes which dye polyacrylonitrile fibers red to blue shades.

Example 6

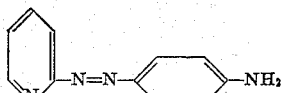

To a refluxing solution of 0.5 part of 2-p-nitrophenylazopyridine in 9.5 parts by volume of ethanol is added a solution of 1.17 parts of sodium sulfide nonahydrate in 8.77 parts of water. The resulting solution is heated at reflux until the reaction is complete. It is then cooled and filtered to give the product as bright orange crystals.

This dye when quaternized, for example, by reaction with dimethyl sulfate, gives a cationic dyestuff which dyes polyacrylonitrile fibers bright red shades with excellent fastness properties.

Example 7

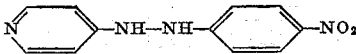

The procedure of Example 1 is followed using an equivalent amount of 4-chloropyridine in place of the 2-bromopyridine.

Example 8

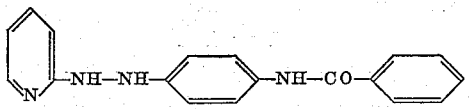

The procedure of Example 1 is followed using an equivalent amount of 4-benzylaminophenylhydrazine in place of the nitrophenylhydrazine. Similar substituted benzoylaminophenylhydrazines such as the 2-toluylamino, p-methoxybenzoylamino, 2,4-dichlorobenzoylamino compounds or the various lower alkanoylamino compounds such as the acylamino and butyrylamino compounds can be used. These products can all be hydrolyzed by heating with dilute acid, after oxidation by the procedures of Examples 3, 4 or 5, to give the aminophenylazopyridine of Example 6.

Example 9

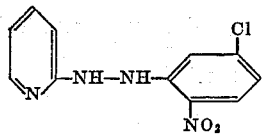

The procedure of Example 1 is followed using 5-chloro-2-nitrophenylhydrazine in equivalent amounts to the 4-nitrophenylhydrazine. Similarly other halogeno-2-nitrophenylhydrazines and halogeno-4-nitrophenylhydrazines and halogeno-2,4-dinitrophenylhydrazines can be used such as:

2-iodo-4-nitrophenylhydrazine
2-chloro-4-nitrophenylhydrazine
5-bromo-2-nitrophenylhydrazine
2,6-dibromo-4-nitrophenylhydrazine
2,6-dichloro-4-nitrophenylhydrazine
5-chloro-2,4-dinitrophenylhydrazine
2-bromo-4,6-dinitrophenylhydrazine
2-chloro-4,6-dinitrophenylhydrazine
4-bromo-2-nitrophenylhydrazine
6-chloro-2,4-dinitrophenylhydrazine
4,5-dichloro-2-nitrophenylhydrazine

Example 10

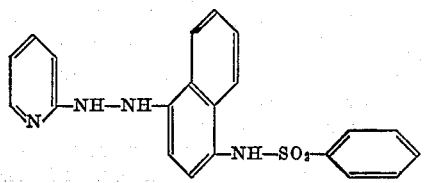

The procedure of Example 1 is followed, using an equivalent amount of 4-phenylsulfonamido-1-naphthylhydrazine in place of the nitrophenylhydrazine. The product can be oxidized by the procedure of Example 3 and the resulting azo compound gives, on hydrolysis by heating with dilute sulfuric acid, 2-(4-amino-1-naphthylazo)-pyridine.

Similarly 4-acetamido-1-naphthylhydrazine or 4-p-methoxybenzamido-1-naphthylhydrazine can be use in equivalent amounts to give the corresponding 4-acylamino-1-naphthyl pyridyl hydrazines which on oxidation and hydrolysis also give 2-(4-amino-1-naphthylazo)-pyridine.

Example 11

The procedure of Example 1 is followed using, in place of 4-nitrophenylhydrazine, other derivatives of this compound or derivatives of 2-nitrophenylhydrazine as shown below. When condensed with 2-bromopyridine, the corresponding $N^1$-phenyl-$N^2$-pyridyl hydrazine is obtained.

PHENYLHYDRAZINE USED 2-methyl-4-nitro-    2,4-dinitro-5-ethyl-
3-methyl-6-nitro-    2,6-dinitro-3-methyl-
4-methoxy-2-nitro-   2,6-dinitro-4-methyl-
2-nitro-4-phenylazo- 4,6-dinitro-2-methyl-
p-anisylazo-4-nitro- 2,4-dinitro-6-ethyl-3-methyl-
acetyl-4-cyano-2-nitro- 5-anilino-2,4-dinitro If, instead of 2-bromopyridine, 4-bromopyridine is used above, the corresponding $N^1$-phenyl-$N^2$-4-pyridyl hydrazine is obtained.

We claim:

1. Hydrazines of the formula

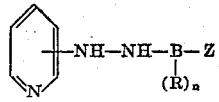

in which the hydrazine bridge is conjugated with the heterocyclic nitrogen of the pyridine ring, B is an arylene radical selected from the group consisting of carbocyclic aryl groups of less than three six membered rings and pyridine, Z is selected from the group consisting of nitro, lower alkanoylamino, benzoylamino, anisylamino, toluylamino, dichlorobenzoylamino, and benzenesulfonylamino, R is a further substituent selected from nitro, halogen, lower alkyl, lower alkoxy, phenylazo, acetyl, cyano and anilino, and $n$ is a whole number from 0 to 3 inclusive, Z being conjugated with the hydrazine bridge through B.

2. $N^1$-4-nitrophenyl-$N^2$-2-pyridylhydrazine.
3. $N^1$-4-acetaminophenyl-$N^2$-2-pyridylhydrazine.
4. $N^1$-2,4-dinitrophenyl-$N^2$-2-pyridylhydrazine.

No references cited.

UNITED STATES PATENT OFFICE

Certificate

Patent No. 2,938,908                                                Patented May 31, 1960

Sien Moo Tsang, Charles E. Lewis, and Albert P. Paul

Application having been made jointly by Sien Moo Tsang, Charles E. Lewis and Albert P. Paul, the inventors named in the patent above identified, and American Cyanamid Company, New York, New York, a corporation of Maine, the assignee, for the issuance of a certificate under the provisions of Title 35, Section 256 of the United States Code, deleting the names of Sien Moo Tsang and Charles E. Lewis from the patent as joint inventors, and a showing and proof of facts satisfying the requirements of the said section having been submitted, it is this 24th day of April 1962, certified that the names of the said Sien Moo Tsang and Charles E. Lewis are hereby deleted from the said patent as joint inventors with the said Albert P. Paul.

[SEAL]

EDWIN L. REYNOLDS,
*First Assistant Commissioner of Patents.*